H. R. EVANS, DEC'D.
A. K. EVANS, EXECUTRIX.
METHOD OF AND APPARATUS FOR FEEDING MOTION PICTURE FILMS.
APPLICATION FILED JUNE 15, 1915.
1,309,471.
Patented July 8, 1919.
8 SHEETS—SHEET 5.
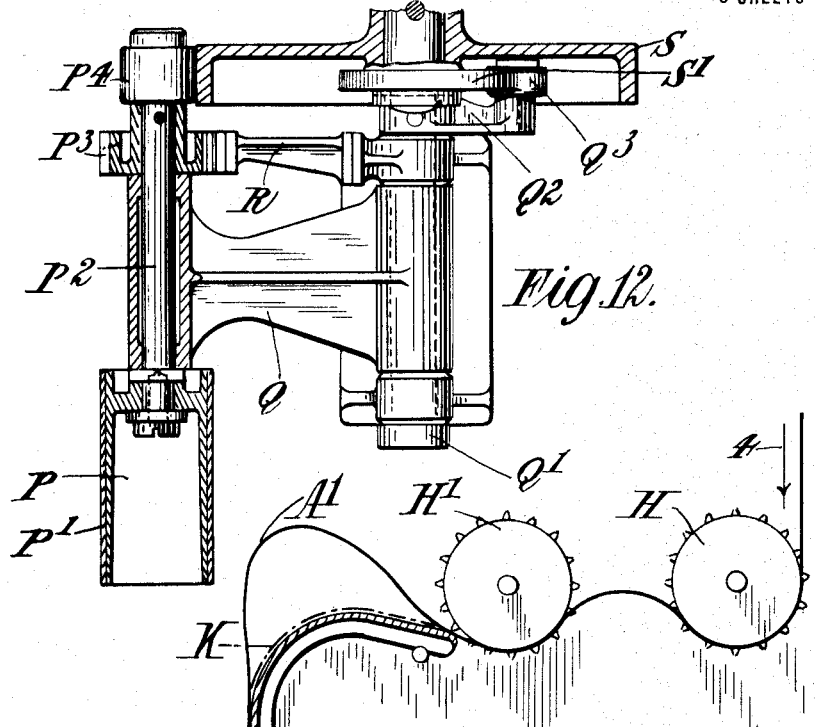
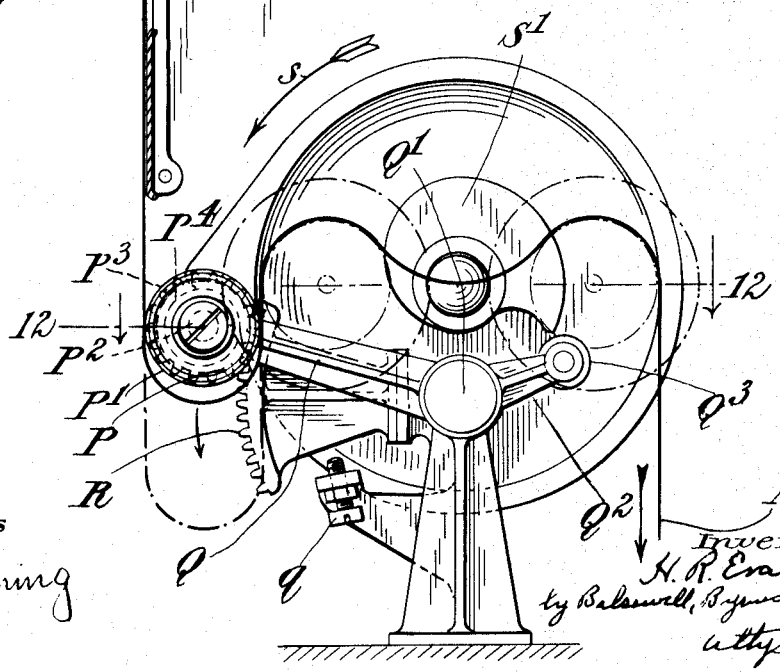

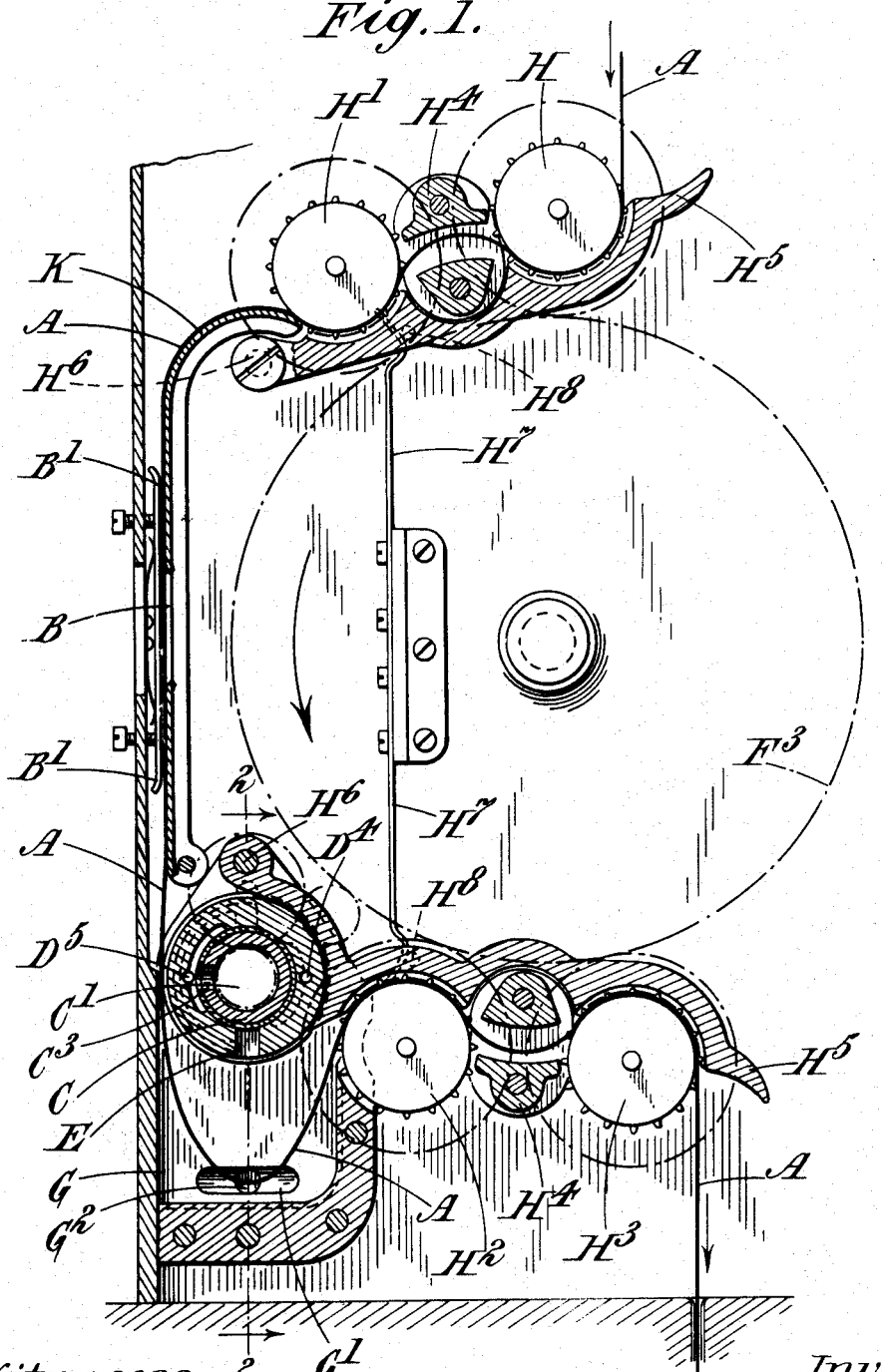

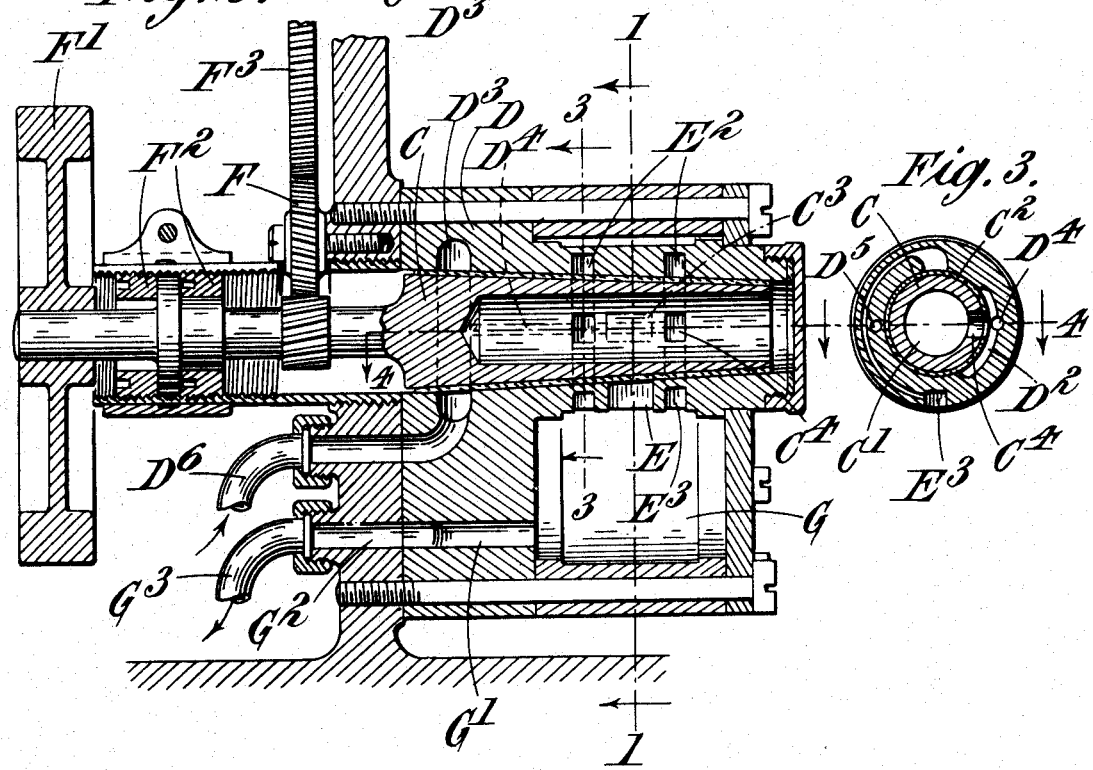

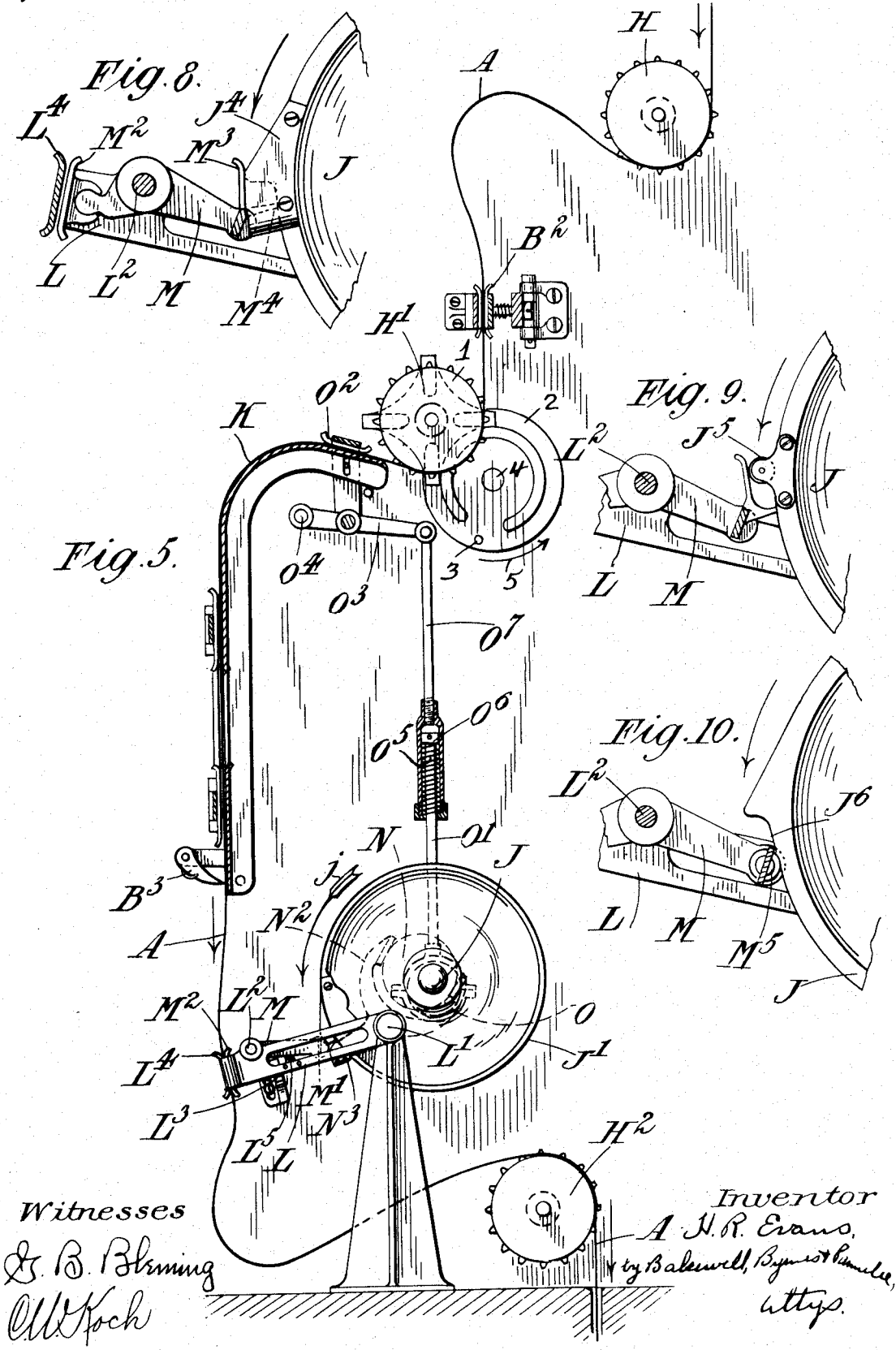

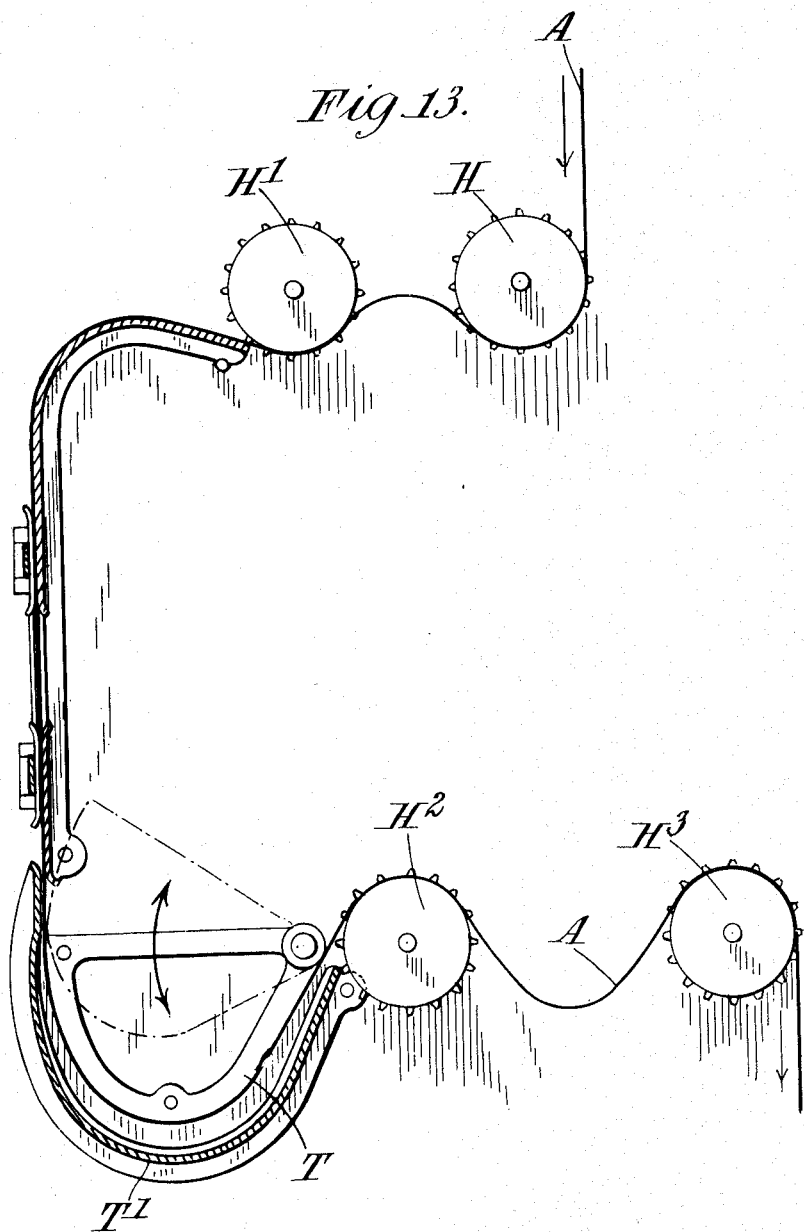

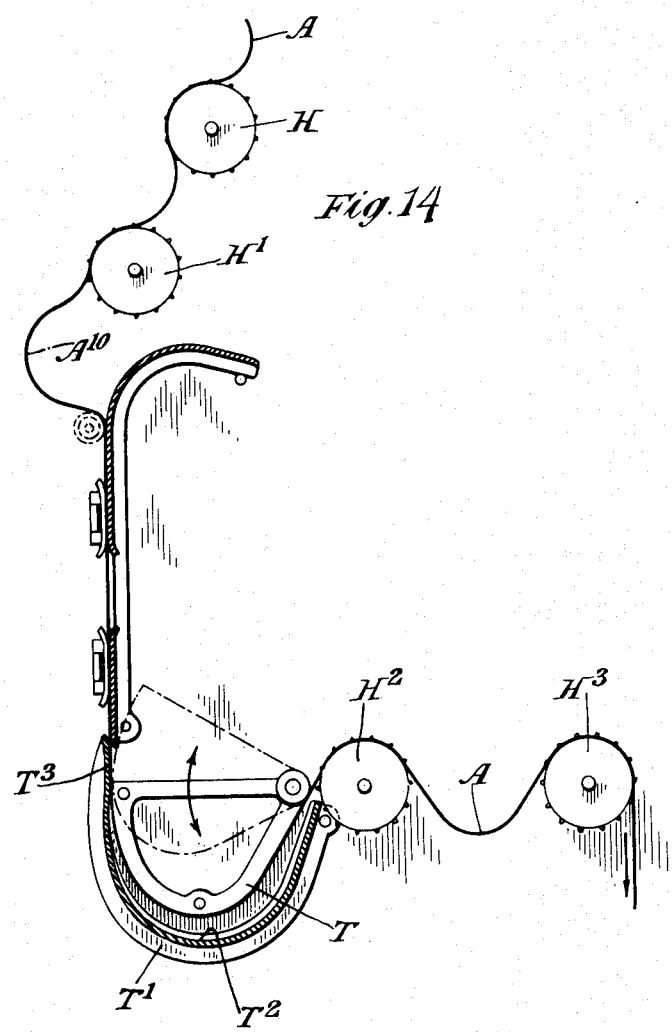

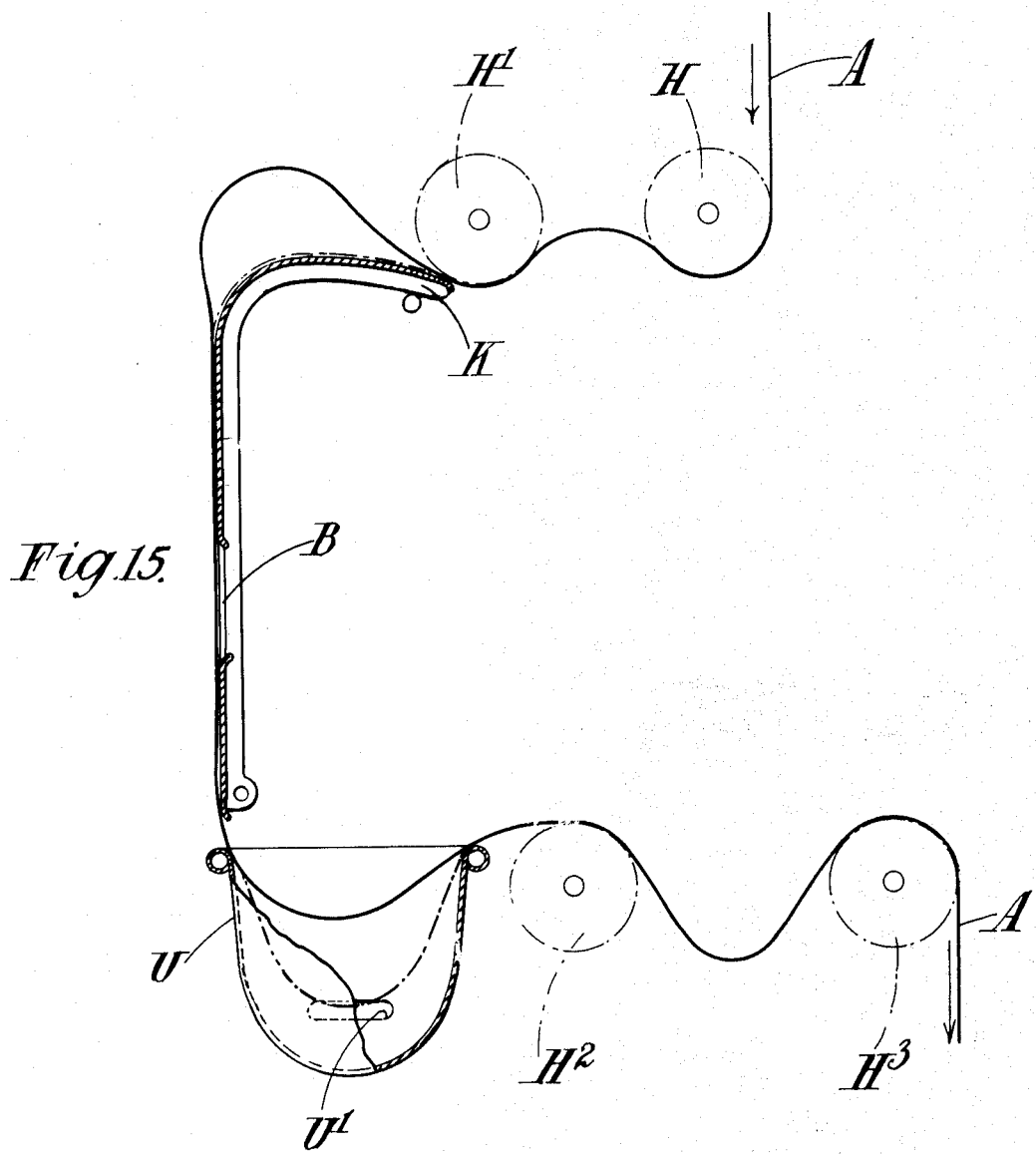

UNITED STATES PATENT OFFICE.

HENRY RIEGEL EVANS, OF LONDON, ENGLAND; ADELE KEAN EVANS EXECUTRIX OF SAID HENRY R. EVANS, DECEASED.

METHOD OF AND APPARATUS FOR FEEDING MOTION-PICTURE FILMS.

1,309,471.   Specification of Letters Patent.   Patented July 8, 1919.

Application filed June 15, 1915. Serial No. 34,311.

*To all whom it may concern:*

Be it known that I, HENRY RIEGEL EVANS, a citizen of the United States of America, residing at 60 Clarence Gate Gardens, Regent's Park, London, W., England, have invented certain new and useful Improvements in Methods of and Apparatus for Feeding Motion-Picture Films, of which the following is a specification.

This invention is for improvements in or relating to the feeding of motion picture film past the gate or light opening, in any desired form of motion picture apparatus, and has for its objects to provide an improved method of feeding the film and improved means by which the method may be carried out. If desired, the means for feeding the film can be so operated as to shift the film more rapidly than has been heretofore possible.

The principal features of the invention relate to that type of apparatus of this general character wherein the film is formed into a bight or loop in advance of the gate, from which bight or loop the film is fed by intermittently-operated means which forms a bight or loop below the gate in the feeding of the film past the same. The stepping movement is thus a bight-forming movement and the mechanism usually provided for intermittently feeding the film in this manner is generally termed a beater.

In apparatus of this kind as hereinbefore constructed undesirable stresses have been occasioned in the film especially where its perforations are engaged with feed or draw-off sprocket-pins. The existence of these undesirable stresses, which arise from a variety of causes, tends to reduce the life of the film and even before it becomes worn out, the accuracy of register may be seriously impaired owing to incipient tearing at the perforations.

One of the said causes has been the employment of mechanism which acts unyieldingly to constrain the film, in the stepping operation to extend over an invariable distance between parts positively engaged with it, and this notwithstanding the difference often present between that fixed distance and the lengths of successive portions of the film which are constrained to occupy that position in succession.

One of the objects of the invention is to provide a method for moving or stepping the film past the gate or window, according to which the usual wear on the film is greatly reduced and a more rapid movement past the gate permitted without serious wear of the film or too much vibration of the machine.

One of the principal objects of the present invention is to provide means for feeding the film from the loop or bight in advance of the gate, in such manner that the film is allowed to complete its stepping movements under a yielding force and preferably under momentum, and in the particular form of the invention herein shown the film completes its stepping movements under its own momentum.

Another object of the invention is to provide means to obviate the wear and tear on the perforations of the film caused by the intermittent jerking of the film against any sprocket or other teeth, particularly in bringing the film to rest in proper register with the gate.

Another object of the invention is to enable reduction of the resistance of the pressure pads at the gate so as to avoid unnecessary wear on the film.

My invention consists in the novel features and combinations hereinafter described and particularly pointed out in the appended claims.

Further objects and advantages of the invention which are directed to the reduction of the wear and tear on the film, the smooth operation and register of the same at the gate, will be more fully understood from the following description taken in connection with the accompanying drawings illustrating by way of example certain constructions embodying various features of the invention.

Figure 1 is a sectional elevation of parts of a kinematograph projector showing pneumatic means according to this invention for stepping the film;

Fig. 2 is a view to a larger scale than that of Fig. 1 and in section on the line 2—2 of Fig. 1 of the valve and adjacent portions of the mechanism shown in Fig. 1;

Fig. 3 is a transverse section on the line 3—3 of Fig. 2, but only of the valve and its casing;

Fig. 4 is a longitudinal central section of the valve and its casing;

Fig. 5 is a view similar to Fig. 1 of an alternative construction operated mechanically;

Fig. 8 is a view similar to Fig. 6 of a modified construction;

Figs. 9 and 10 are views in elevation of modified constructions of the cam action portions of Fig. 6;

Fig. 11 is a view similar to Fig. 1 of an alternative construction;

Fig. 12 is a horizontal section on the line 12—12 of Fig. 11 but to a larger scale than that of Fig. 11;

Fig. 13 is a view similar to Fig. 1 illustrating yet another modification;

Fig. 14 shows a modification of the embodiment shown in Fig. 13; and

Fig. 15 is a diagrammatic drawing similar to Fig. 1 of an alternative pneumatic construction.

Figure 6:
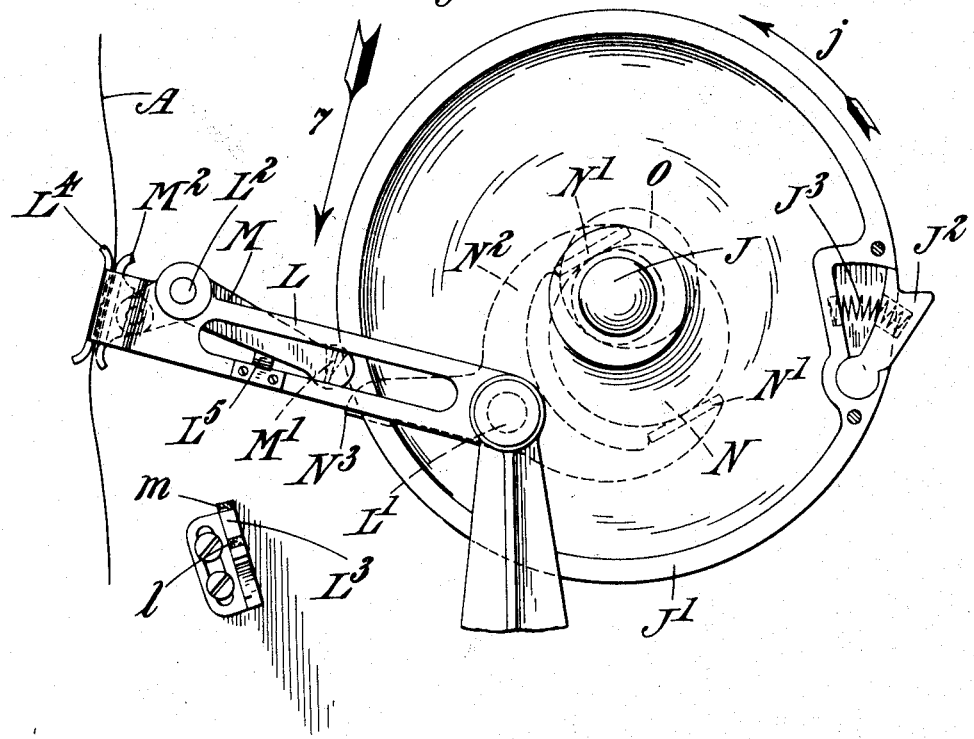
Fig. 6 is a view to an enlarged scale of a portion of Fig. 5.

In Fig. 1 is shown apparatus including pneumatic mechanism for stepping a film indicated at A past a gate B of a projector by means of puffs of air caused periodically to impinge upon the film by means of a rotary valve C. In this form of the invention, as well as in the other forms herein described, for the purpose of permitting the film to complete its stepping movements under a yielding force, the pressure of the pressure pads B' at the gate can be made and is made relatively light as compared with the usual practice, and sufficiently light to permit the film to complete its stepping movements under a yielding force, and in the present embodiments herein shown, under its own momentum. This obviously reduces the wear on the film. The valve body C is approximately cylindrical but is slightly coned to insure fit and enable wear to be taken up; it is in the form of a hollow plug, the cavity being seen at $C^1$ and is provided with a sleeve $C^2$ of oiled raw-hide. It operates in a casing or seating D.

The ports in the plug and casing are as follows: The plug has a single port $C^3$ coöperating with a double port, that is to say, a port constituted by two openings $C^4$ diametrically opposite the port $C^3$; these three all pierce the wall of the plug. In the casing are three inlet ports seen most clearly in Fig. 4, namely a single port $D^1$ and a pair of ports $D^2$ in the same horizontal plane as $D^1$ and to coöperate therewith; these three communicate with a common inlet passage $D^3$ by means of ducts $D^4$ and $D^5$ respectively. Air under pressure is delivered to the passage $D^3$ from any convenient source by means of the supply pipe $D^6$. The outlet ports in the casing are three in number and are seen at E and $E^2$; the latter although situated in the upper part of the casing as seen in Fig. 2, discharge by means of circumferentially placed ducts leading to the openings $E^3$. The object of providing the plug with diametrically opposite ports, and the casing with similarly disposed ports to register therewith is to obtain as complete balance as possible with reference to the fluid pressure; for this purpose each single port such as $C^3$, $D^1$, or E is made of area just equal to the sum of its two fellows, namely $C^4$, $D^2$, or $E^2$ respectively.

The valve is driven by means of helical spur gearing seen at F and carries on its spindle a fly-wheel $F^1$. Any suitable means are provided as indicated at $F^2$ to adjust the position of the plug with reference to its casing in the axial direction to insure smooth running and avoidance of leakage. A chamber G which will be designated the exhaust chamber is provided beneath the valve and has at the lower portion of one wall an outlet port $G^1$ communicating by a passage $G^2$ to the outlet $G^3$ for exhaust air. At the upper portion of the apparatus are two feed sprockets H, $H^1$ and at the lower portion two draw-off sprockets $H^2$, $H^3$ and between the upper pair and between the lower pair is a device seen at $H^4$ hereinafter called the gap-limiter. It is in the form of a block through which is a curved guide passage for the film whose dimensions are so chosen that only a suitable length of film can be comprised between the two sprockets of a pair; its object is to insure the film being strutted between the pins on one sprocket and the pins on the fellow sprocket so that when tension is applied to the film on either side of a pair of sprockets the film is not hammered against the pins.

Beneath the upper pair of sprockets and above the lower pair are guard plates $H^5$ hinged at $H^6$ and the sprockets are all driven from one main gear wheel whose pitch line is seen at $F^3$ (Fig. 2). The same gear wheel serves to drive the valve C through the gears F, the pitch circles of these being indicated in chain line; the pitch circles of the gears driving the sprockets are also indicated in chain line (Fig. 1).

The operation of the mechanism is as follows:—The upper guard plate $H^5$ is depressed and the film threaded on the sprocket H through the adjacent guide channel in the gap limiter H⁴ on to the sprocket H¹. If the attempt be made to thrust too much film between the two sprockets it butts up against one wall of the channel in H⁴ and if too little it is drawn taut on the other wall of the channel so that only the correct amount can be inserted if the sprockets are properly engaged. The guard plates H⁵ are held in position by a plate spring H⁷ engaging with pins H⁸ on the plates. When the film has been threaded through the upper sprockets the guard plate is snapped back and is held back by the spring H⁷ and pin H⁸. The film is then led over the upper curved portion of a film guide plate K at which location enough slack is fed from the sprocket H¹ to form a bight or loop in the film above said curved plate, and from thence the film is fed past the gate B under the tension pads B¹ down into the exhaust chamber G and then onto the draw-off sprockets H², H³ through the coöperating gap limiter H⁴; for the last portion of this operation the lower guard plate H⁵ is snapped up against the spring H⁷ and then snapped back when the operation has been completed.

As the wheel F³ is rotated air enters the hollow interior C¹ of the valve body C which is thus filled with its volume of compressed air and with the rotation of the valve this volume is then delivered through the ports E, E³ on to the film A where it is stretched across the exhaust chamber G. A measured puff of compressed air is thus periodically delivered on to the film here and at each puff it is deflected into the position in which it is seen in Fig. 1 so that the film is drawn taut over the former plate K and is thus stepped. As the film passes the port G¹ the air escapes by the pipe G³.

The feed sprockets H, H¹ always tend to form a bight above the plate K and it will be appreciated therefore that this plate in coöperation with the pins of the sprocket H¹ definitely determines the amount by which the film is stepped by each puff of air. It will be seen that the location of the curved plate K with respect to the bottom teeth of the feed sprocket H¹ is such that when the film is pulled taut by the puff of air onto the surface of this curved plate, the plate relieves the strain that would otherwise take place between holes in the film and the lower teeth of sprocket H¹, due to the rapid intermittent jerking of the film against the lowest teeth of sprocket wheel H¹. While the teeth of this sprocket wheel coöperate with the curved plate K to arrest the film at the end of its stepping movement so as to bring it to the desired position at the window, yet the strain between the sprocket teeth and the film perforation is relieved by the curved plate. The curved path of the film between the sprockets H, H¹ and also between the sprockets H², H³ causes it to be strutted between the sprockets so that hammering on the perforations of the film is prevented.

The gears connecting the various parts which are rotated from the wheel F³ with that wheel are so chosen as to give the proper relative movements and desired relative positions between them.

It will be observed that the sprockets H², H³ are made to occupy a position in which H² is brought close against the wall of the chamber G so as to be virtually inclosed by this wall and a portion of the guard plate H⁵. By this means exhaust air is impeded from passing out of the exhaust chamber by way of the film that is being drawn off and this provides an element of safety in case of fire.

Figure 7:
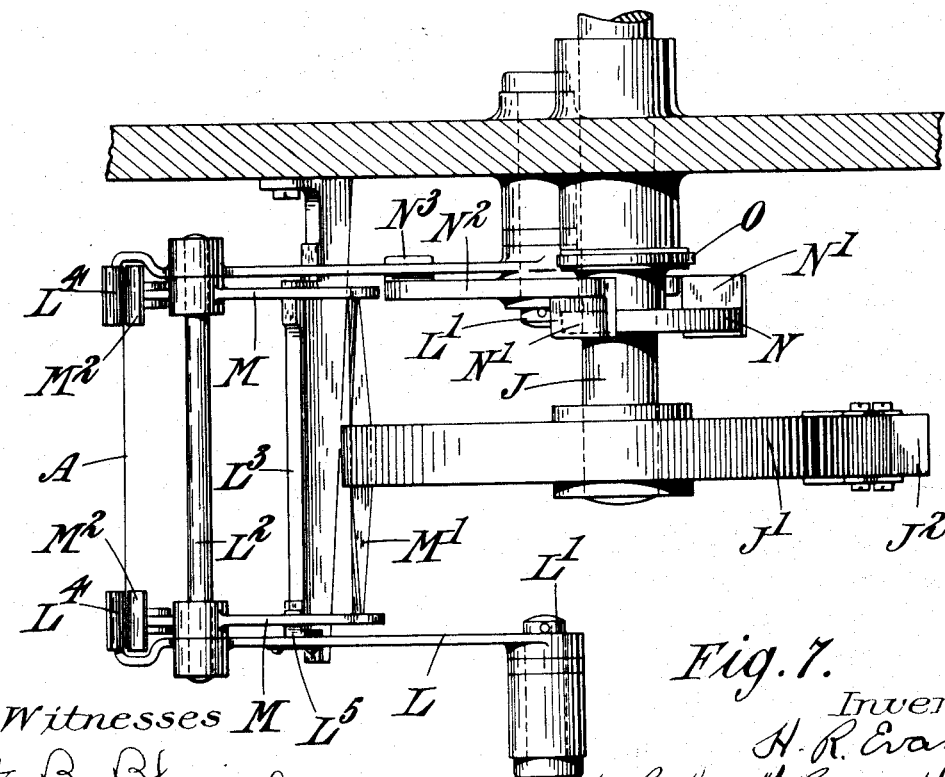
Fig. 7 is a plan view taken in the direction of the arrow 7 of Fig. 6.

In the construction illustrated in Figs. 5, 6 and 7 the film is not drawn taut by pneumatic effect but mechanically; upon an operating shaft J is a cam disk J¹ provided with a cam J² pivotally mounted in a recess in the disk from which recess it is normally projected by means of a compression spring J³. A device hereinafter called the feed rocker, pivoted at L¹ and formed of two arms L united at their free ends by a bar L² serves periodically to engage the film and move it downward to step it. To enable this to be done there is a frame formed of two arms M pivoted on the bar L² each arm M being in the form of a bell-crank lever whose long ends are united by a cross-bar M¹ and whose short ends carry presser-feet M². The shaft J also carries an eccentric disk N which coöperates with the jaws N¹ on a short pivoted lever N²; this lever is pivoted upon one of the pivots L¹ which support the feed rocker and its short arm N² is directed beneath one of the arms M of the frame above referred to; this frame is hereinafter called the gripper frame. A second eccentric O is mounted on the shaft J and through its sleeve and a rod O¹ operates a pad O² (Fig. 5) through the medium of a rocking arm O³ pivoted at O⁴. The connection between the rod O¹ and the arm O³ is by means of a telescopic joint within which is a compression spring O⁵. The collapsing of the joint is limited by the abutment of a disk O⁶ upon the rod O¹ meeting a similar disk upon the continuation rod O⁷ but the extension of the joint is determined by the pressure of the spring O⁵ and the amount by which the downward travel of the pad O² is checked. A tension pad for the film is provided at B² between the sprockets H, H¹, a spring pawl B³ just below the gate, and a stop whose position is adjustable at L³ below the feed rocker L; these last mentioned three details serve to provide additional control for the film in its movements.

The operation is as follows: The shaft J is rotated in the direction of the arrow $j$, seen in Fig. 5 and is geared in a well-known manner through gearing not shown to the sprockets H, $H^1$, $H^2$. As the cam rotates the nose of $J^2$ strikes the bar $M^1$ of the gripper frame so causing this to move slightly about the center $L^2$ and grip the film between the feet $M^2$ and corresponding feet $L^4$ carried upon the feed rocker L. The continued movement of the cam then carries the feed rocker downward, the film being gripped by it but the parts are so proportioned that the cam clears the bar $M^1$ before the rocker strikes its stop $L^3$. At each end of the stop $L^3$ there are two impact surfaces so disposed that one of them strikes an arm M before the other is struck by the rocker L with the result that the grip upon the film is positively and automatically released. A light plate spring $L^5$ at once imparts a relative return movement to the gripper frame about its pivot at $L^2$ so freeing the film and the latter continues its downward movement under its own inertia alone through the short remaining portion of its travel until it is drawn taut over the former plate at K. Prior to its being taut the pad $O^2$ has been brought down into the position shown in Fig. 5 thereby relieving the pins of the sprocket $H^1$ of some at least of the pull due to the film being stepped. The gearing between the sprocket $H^1$ and the shaft J is of such a character that the sprocket is intermittently rotated and is at rest at the moment when the film is stepped and when the pad $O^2$ is gripping the film. The gearing for accomplishing this intermittent rotation or drive of the sprocket $H^1$ may be of any well known form, such form of gearing being generally known as the Geneva movement, and is shown for example in U. S. Patent 578,185, granted on March 2, 1897, to Thomas Armat, for a vitascope. This same type of gearing has in one form or another been utilized in motion picture machines below the gate for engaging and intermittently moving the film, but so far as I am aware, it has not been used for engaging and moving the film above the gate, and I have found that considerable advantage results from the intermittent driving of the film above the gate for the purpose pointed out. The Geneva movement is shown diagrammatically herein as consisting of the star wheel 1 secured to the shaft of the sprocket $H^1$, the star wheel being intermittently driven by pin 3 mounted on disk 2 on shaft 4, the shaft being rotated in the direction indicated by the arrow 5, and suitably geared in any desired manner (as is well understood in the art and hence not shown herein) with the other film-driving mechanism such as shaft J and sprockets H, $H^2$. It will be understood that the same intermittent driving mechanism is utilized for driving the sprocket $H^1$, in the other modifications of the invention hereinafter described. The film having been stepped the rocking lever $N^2$ commences that part of its motion by which the end $N^3$ is moved upward; this in its upward movement engages the bar $M^1$ and returns the feed rocker and gripper frame to their normal positions in which they are seen in Fig. 6, where they are retained by friction. At the instant when the stepping of the film is just completed these parts are in the positions seen in Fig. 5.

If the shock of impact of the cam $J^2$ upon the bar $M^1$ be found objectionable either of the alternative constructions seen in Figs. 8, 9 and 10 may be adopted, but in any case it is desirable that the bar $M^1$ should be loosely mounted in the arms M in order to allow for slight inequalities in the film, such for example as a join, requiring a different degree of movement of one of the gripper feet $M^2$ from that required by the other; moreover these feet are preferably pivotally mounted upon the gripper arms in the manner seen in Fig. 8 so as to allow them to find their own bearing upon the film.

The device to minimize shock employed in the construction of Fig. 8 comprises a plate $M^3$ mounted on the arm $M^1$ which coöperates with two cheek plates $J^4$ one on either side of the cam and with a right-angled extension $M^4$ to the plate $M^3$ to form a chamber within which air is slightly trapped at the moment of the blow to constitute an air cushion. The plates $M^3$, $M^4$ may be integral with one another and the bar $M^1$ is preferably made somewhat springy to permit them to rock by the slight amount required.

In the construction shown in Fig. 9 the cam is in the form of a roller $J^5$ and is made to operate the feed rocker by an L-shaped piece similar to the plates $M^3$, $M^4$ but so shaped that the roller $J^5$ strikes the upward extension before the lower and thus comes somewhat gradually into operation.

In the construction shown in Fig. 10 the bar $M^1$ is provided with a roller $M^5$ and the periphery of the cam is shaped at $J^6$ so as to have a slightly increasing radius before the actual nose is reached and thus commence the action on the bar $M^1$ more or less gradually.

In Figs. 11, 12 and 13 are shown types of movement in which a member commonly styled a beater, is used to strike the film at a point between the gate and the draw-off sprocket, and by so striking it, step it. It will be seen that the mechanism shown in Fig. 1 is in this respect of the same general type as that in Figs. 11, 12 and 13, although the beater in this instance is not a mechanical structure, but a puff of compressed air for impinging upon the film to step it.

The beater in Fig. 11 is in the form of a roller P preferably shod with a sleeve $P^1$ which may be of hardened and polished steel or if found desirable may be of rubber or felt or similar material. The roller P is secured upon a spindle $P^2$ mounted in the free end of a rocking arm Q pivotally mounted on a fixed spindle $Q^1$. Upon the spindle $P^2$ is secured a pinion $P^3$ and an anti-friction bowl $P^4$. Upon the fixed spindle $Q^1$ is secured a stationary segmental rack R. Two cam disks S, $S^1$ rotate above the center of the spindle $Q^1$, the disk S operating the arm Q in the downward direction by means of the bowl $P^4$ and the disk $S^1$ serving to return the arm Q to its upper position by operating upon a rearward extension $Q^2$ of the arm Q which is provided with a friction bowl $Q^3$.

The operation of this mechanism is as follows: The cams S, $S^1$ are rotated in the direction of the arrow s, seen in Fig. 11, and when the projection upon S strikes the bowl $P^4$ it carries the spindle $P^2$ and arm Q, downward with it until, by reason of the difference of their paths the projection clears the bowl $P^4$. In its downward travel the pinion $P^3$ is caused to rotate by reason of its engagement with the rack R and thus the roller P rolls upon the film A without abrading it, the gears and diameter of the roller sleeve $P^1$ being so chosen as to insure this. The arm Q is returned to its upper position, namely that in which it is seen in Fig. 11, by reason of the engagement of the disk $S^1$ with the bowl $Q^3$. In this construction the travel of the beater is preferably so adjusted that the film completes its stepping movement by its own inertia, the amount of step being determined as before by the drawing taut of the bight seen at $A^1$ upon the former plate K in coöperation with the pins of the feed sprocket $H^1$.

The beater seen in Fig. 13 takes the form of a curved plate T oscillating up and down between the full line position and the dotted line position in the cavity of a curved trough-like bight-receiver $T^1$, concave in longitudinal section, and shown in the drawing as having one side removed. In this figure the sprockets H, $H^1$ are so arranged as to feed the film in a horizontal direction so as to cause the loop to project up vertically above the upper curved surface of plate K which acts with sprocket $H^1$ as the film movement-limiting means as the film is moved down by the beater T, and in this instance the receiver $T^1$ is unnecessary and may be dispensed with.

When the supply sprockets H and $H^1$ are placed in the position shown in Fig. 14, the loop $A^{10}$ formed by them in feeding the film, projects out horizontally from the vertical plane of the gate B, and in this form of the invention the curved plate K does not constitute the film-movement-limiting means as in the other forms of the invention heretofore described, but the limiting means in this instance is placed below the gate, and in this modification consists of the aforesaid receiver $T^1$, of substantially the contour of the beater T, the stepping movements of the film being limited by the film being brought into engagement with the said concave surface of the receiver $T^2$. In this form of the invention the beater T is driven up and down in any suitable manner, but, as shown by the dotted- and full-line positions thereof, without permitting it to so closely approach the said concave limiting surface of the receiver as to positively force the film all the way down onto said surface, the beater stopping short of said surface, thus permitting the film to complete its stepping movement into engagement with the surface $T^2$ under a yielding force, as by its own momentum.

It is preferable to provide a guide plate between the surface of the film-movement-limiting means and the gate, and in Fig. 14, whenever the receiver $T^1$ is used, its upper end that is substantially in the plane of the gate is continued upward in the form of a guide plate $T^3$.

Fig. 15 shows a construction in which the film is made to pass over the open top of a box-like chamber U in the side of which, and toward the bottom, is a port $U^1$. The port is connected to an exhauster with which communication is periodically and automatically established so as suddenly to exhaust the air in the chamber U beneath the film A. The suction thereby created upon the film draws it down but as the film passes the port $U^1$ the suction is released and the film continues its movement under its own inertia.

While I have described my invention with particularity as to certain forms thereof, it will be obvious to those skilled in the art, after having understood my invention, that various modifications may be made therein without departing from the spirit or scope of the same, and I do not wish to be understood as limiting myself other than as indicated in the appended claims.

What I claim as my invention and desire to secure by Letters Patent is:—

1. In motion picture apparatus, the combination of a gate past which the film is fed, means for forming a loop in the film in advance of the gate, and means for feeding or stepping the film intermittently from said loop past the gate, said means having provision whereby the film completes its stepping movements under a yielding force, 2. In motion picture apparatus, the combination of a gate past which a film is fed, means for forming a loop in the film in advance of the gate, and means for feeding or stepping the film intermittently from said loop past the gate, said means causing the film to complete its stepping movements by momentum.

3. In motion picture apparatus, the combination of a gate past which a film is fed, means for forming a loop in the film in advance of the gate, and means for feeding or stepping the film intermittently from said loop past the gate, said means having provision whereby the film completes its stepping movements under its own momentum.

4. In motion picture apparatus, the combination of a gate past which a film is fed, means for forming a loop in the film in advance of the gate, and means for feeding or stepping the film intermittently from said loop past the gate, said means engaging and positively feeding the film during the first part of its stepping movements but permitting the film to complete said movements under a yielding force.

5. In motion picture apparatus, the combination of a gate past which a film is fed, means for forming a loop in the film in advance of the gate, and means including an operated film-engaging member for intermittently feeding the film from said loop past the gate by engaging and positively feeding the film during a part of its stepping movements, but permitting the film to complete its stepping movements by momentum.

6. In motion picture apparatus, the combination of a gate past which a film is fed, means for forming a loop in the film in advance of the gate, means for feeding or stepping the film intermittently from said loop past the gate, and film-movement-limiting means including a toothless curved surface into engagement with which the film is brought by each stepping movement to limit its stepping movements, thereby reducing the usual wear and strain on the perforated portions of the film.

7. In motion picture apparatus, the combination of a gate past which a film is fed, means for forming a loop in the film in advance of the gate, means for feeding or stepping the film intermittently from said loop past the gate, and film-movement-limiting means having a toothless curved surface at one side of the plane of the gate with one end of said surface substantially tangent to said plane and into engagement with which surface the film is brought by each stepping movement to limit its stepping movements, thereby reducing the usual wear and strain on the perforated portions of the film.

8. In motion picture apparatus, the combination of a gate past which a film is fed, means for forming a loop in the film in advance of the gate, means for feeding or stepping the film intermittently from said loop past the gate, and film-movement-limiting means on that side of the gate at which the intermittent film-feeding means is located, said limiting means having a toothless curved surface into engagement with which the film is brought by each stepping movement to limit its stepping movements, thereby reducing the usual wear and strain on the perforated portions of the film.

9. In motion picture apparatus, the combination of a gate past which a film is fed, means for forming a loop in the film in advance of the gate, means for feeding or stepping the film intermittently from said loop past the gate, and film-movement-limiting means on that side of the gate at which the intermittent film-feeding means is located, said means being in the form of a receiver into which the film is brought by each stepping movement to limit its stepping movements to register the film at the gate.

10. In motion picture apparatus, the combination of a gate past which a film is fed, means for forming a loop in the film in advance of the gate, means for feeding or stepping the film intermittently from said loop past the gate, and film-movement-limiting means on that side of the gate at which the intermittent film-feeding means is located, said means having a surface concave in longitudinal section and into engagement with which the film is brought by each stepping movement.

11. In motion picture apparatus, the combination of a gate past which a film is fed, means for forming a loop in the film in advance of the gate, means for feeding or stepping the film intermittently from said loop past the gate, and film-movement-limiting means on that side of the gate at which the intermittent film-feeding means is located, said means being in the form of a receiver having a surface concave in longitudinal section with one end thereof terminating substantially in the plane of the gate and into engagement with which concave surface the film is brought by each stepping movement to limit its stepping movements to register the film at the gate.

12. In motion picture apparatus, the combination of a gate past which a film is fed, means for forming a loop in the film in advance of the gate, means including a film-engaging member having a convex film-engaging portion for intermittently feeding the film from said loop, and film-movement-limiting means having a receiver of substantially the same contour in longitudinal section as the film-engaging member and into which receiver the film is moved and caused to conform to the contour thereof to limit the stepping movements of the film.

13. In motion picture apparatus, the combination of a gate past which a film is fed, means for forming a loop in the film in advance of the gate, means for feeding or stepping the film intermittently from said loop past the gate, film-movement-limiting means including a toothless curved surface into engagement with which the film is brought by each stepping movement to limit its stepping movements, thereby reducing the usual wear and strain on the perforated portions of the film, and a guide for the film extending from said curved surface and substantially in the plane of the gate so as to guide the film.

14. In motion picture apparatus, the combination of a gate past which a film is fed, means for forming a loop in the film in advance of the gate, means for feeding or stepping the film intermittently from said loop past the gate, said means having provision for allowing the film to complete its stepping movements under a yielding force, and film-movement-limiting means including a toothless curved surface into engagement with which the film is brought by each stepping movement to limit its stepping movements, thereby reducing the usual wear and strain on the perforated portions of the film.

15. In motion picture apparatus, the combination of a gate past which a film is fed, means for forming a loop in the film in advance of the gate, means for feeding or stepping the film intermittently from said loop past the gate, said means having provision for allowing the film to complete its stepping movements under a yielding force, and film-movement-limiting means on that side of the gate at which the intermittent film-feeding means is located, said limiting means having a toothless curved surface into engagement with which the film is brought by each stepping movement to limit its stepping movements, thereby reducing the usual wear and strain on the perforated portions of the film.

16. In motion picture apparatus, the combination of a gate past which a film is fed, means for forming a loop in the film in advance of the gate, means for feeding or stepping the film intermittently from said loop past the gate, said means engaging and positively feeding the film during the first part of its stepping movements, but permitting the film to complete said movements under a yielding force, and film-movement-limiting means on that side of the gate at which the intermittent film-feeding means is located, said means being in the form of a receiver into which the film is brought by each stepping movement to limit its stepping movements to register the film at the gate.

17. In motion picture apparatus, the combination of a gate past which a film is fed, means for forming a loop in the film in advance of the gate, means including an operated film-engaging member for intermittently feeding the film from said loop past the gate by engaging and positively feeding the film during a part of its stepping movements, but permitting the film to complete its stepping movements by momentum, and film-movement-limiting means having a receiver of substantially the same contour in longitudinal section as the film-engaging member and into which receiver the film is moved and caused to conform to the contour thereof to limit the stepping movements of the film.

18. The method of feeding motion picture film past a gate of a motion picture machine, which comprises stepping the film intermittently past the gate, allowing it to complete its stepping movements under a yielding force.

19. The method of feeding motion picture film past a gate of a motion picture machine, which comprises feeding the film to form a loop in advance of the gate and moving the film step by step past the gate under positive force during the first part of its stepping movements and allowing it to complete said movements under a yielding force.

20. The method of feeding motion picture film past a gate of a motion picture machine, which comprises forming a loop in advance of the gate, engaging the film to positively move it from said loop past the gate during the first and major portion of its stepping movements and allowing it to complete said movements under momentum.

21. The method of feeding motion picture film past a gate of a motion picture machine, which comprises intermittently forming loops in the film in advance of the gate, moving the film from the loops step by step past the gate under positive force during the first part of its stepping movements, allowing it to complete said movements under a yielding force, and continuously and substantially uniformly taking up the stepped film.

22. The method of feeding motion picture film past a gate of a motion picture machine, which comprises feeding the film to form a loop in advance of the gate and moving the film step by step past the gate by impelling it for the first part of the stepping movement under positive force, and subsequently under a yielding force.

23. In motion picture apparatus, the combination of a gate past which a film is fed, means for forming a loop in the film in advance of the gate, and means for feeding or stepping the film intermittently from said loop past the gate, said means engaging and positively feeding the film during the first part of its stepping movement but permitting subsequent movement under a yielding force.

24. In motion picture apparatus, the combination of a gate past which a film is fed, intermittently operated means for forming a bight in the film in advance of the gate so as to bring the film of the bight intermittently and momentarily at rest at the end of the formation of each bight, and means for feeding the film intermittently from said bight past the gate.

In testimony whereof I have signed my name to this specification in the presence of two subscribing witnesses.

HENRY RIEGEL EVANS.

Witnesses:
  HAROLD H. SIMMONS,
  HARRY B. BRIDGE.